Feb. 18, 1947.  J. R. BATTALINE  2,416,083
SELF ADJUSTING GEAR OR CLUTCH DISK
Filed Dec. 4, 1944
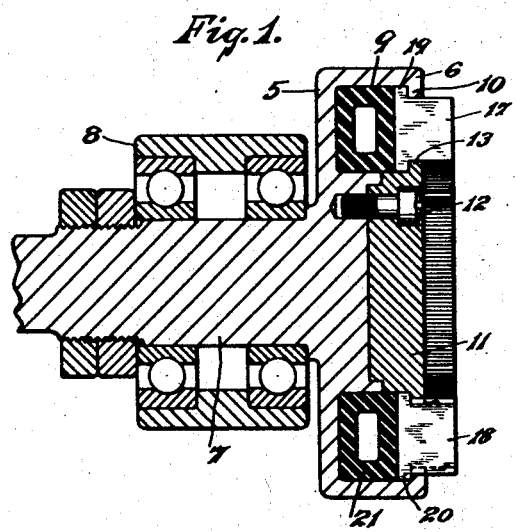
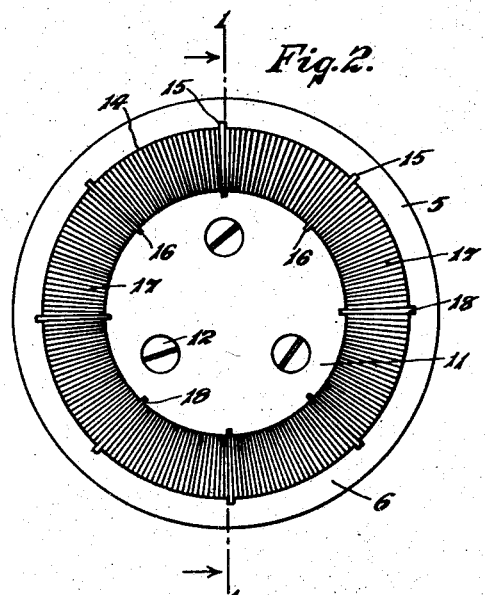
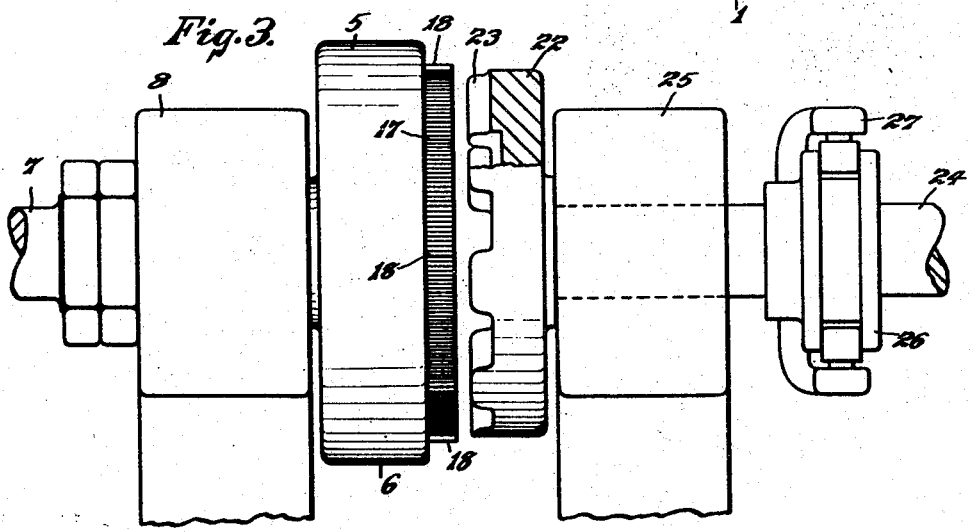
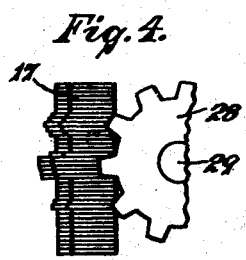
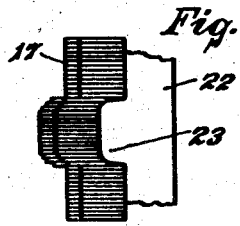
INVENTOR.
JOHN R. BATTALINE.
BY
Louis V. Lucia
ATTORNEY.

Patented Feb. 18, 1947

2,416,083

UNITED STATES PATENT OFFICE 2,416,083

SELF-ADJUSTING GEAR OR CLUTCH DISK

John R. Battaline, Hartford, Conn.

Application December 4, 1944, Serial No. 566,497

4 Claims. (Cl. 192—67)

This invention relates to power transmitting means and more particularly to a self-adjusting or resilient gear or clutch disc which is adapted to intermesh with members having teeth or projections of different sizes.

An object of the invention is to provide means for transmitting power in a manner which will permit gradual intermeshing of engageable members so as to derive power at variable speeds starting from a low speed and gradually increasing up to the full speed of the power delivering member.

A further object of this invention is to provide a power transmitting member having means thereon for engaging and conforming with engageable projections on another member.

Further objects and advantages of the invention will be more clearly understood from the following description and from the accompanying drawing in which—

Fig. 1 is a view in central vertical section of the power transmitting member embodying my invention.

Fig. 2 is an elevational end view thereof.

Fig. 3 is an elevational side view of said member and of another member adapted to engage with the same.

Fig. 4 is a fragmentary view illustrating the operation of my invention with one form of a gear.

Fig. 5 is a similar view illustrating the operation with the other member shown in Fig. 3.

As shown in the drawing, the numeral 5 denotes the driving member of a power transmitting device, which may be in the form of a disk 6 on a bar 7 that is rotatably mounted in a suitable bearing 8. The said disk is provided with an annular groove 9 having an inwardly projecting lip 10. A disk-shaped plate 11 is secured to the front of the disk 6, by means of screws 12, and has an outwardly extending flange 13 which cooperates with the lip 10 and the groove 9 to form an annular slot 14 in the face of the plate 6. The lip 10 and the flange 13 are each respectively provided with oppositely corresponding notches 15 and 16 for the purpose to be hereinafter described.

A plurality of relatively thin plates 17 are slidably mounted within the slot 14 and a series of similar plates 18, but slightly wider, are mounted in said slot and register with the notches 15 and 16, as clearly illustrated in Fig. 2 of the drawing. The said plates are respectively provided with projecting flanges 19 and 20 which engage the inner walls of the lip 10 and the flange 13 to retain the plates 17 and 18 in their outward position so that they will project outwardly from the face of the disk 6 in alignment with each other.

The said plates are urged toward their outwardly projecting position by suitable means, such as a cushion in the form of a ring 21 which is preferably hollow and constructed of resilient material such as rubber or the like.

As illustrated in Fig. 3 of the drawing, my improved power transmitting means may be used in cooperation with a driven member such as illustrated at 22 and which is preferably in the form of a disk having a series of projections or teeth 23 thereon facing the plates 17 and 18 of the driving member 5. The said member 22 is mounted on a shaft 24 which rotates within a suitable means of a suitable collar 26 and an operating lever 27 having a yoke in engagement with said collar to move the disk 22 towards or away from the member 5 and the plates 17 and 18 thereon.

The operation of my invention is as follows:

When the members are in the position shown in Fig. 3, the member 5 is preferably the driving member and in rotation while the driven member 22, being out of engagement with the driving member, is stationary. When it is desired to obtain power from the driving member 5, for rotating the shaft 24, the operating lever 27 is actuated to move the shaft 24 and the disk 22 thereon towards the member 5. This may be done slowly so that the teeth 23 will at first lightly engage with the edges of the plates 17 and 18 and thus permit a sliding action, or slippage, between the plates and the teeth which will start rotation of the member 22 in a gradual manner. Continuing the movement of the said member 22 for fuller engagement with the plates 17 and 18 will gradually bring the said plates and teeth 23 into full engagement, as illustrated in Fig. 5, whereby the member 22 will be in complete mesh with the member and will be driven at the full speed of the said member 5.

As illustrated in Fig. 4, the driving member 5 may be used in connection with a driven gear 28 which may rotate upon a shaft 29 that is disposed with its axis extending at right angles to the axis of the driving member 5. The said gear may be slidably mounted so that it can be moved towards or away from the axis of the driving member 5 to thereby increase or reduce the speed ratio between the driving member and the driven gear 28; thus various speeds may be obtained by simply sliding the gear along the face of the adjustable surface provided by the plates 17 and 18.

While I have provided a cushion 21, for urging the plates outwardly to conform to the contour of the teeth or projections engaging the front edges of said plates, pressure applying means, such as springs or the like, may be used for urging said plates outwardly and into engagement with the projections on the driven member in such a manner that the position of each of said plates will conform closely to the contour of said projections, as illustrated in Figs. 4 and 5. It will also be noted that the plates 17 and 18 are slightly tapered, or wedge-shaped, so that they radiate from the axis of the driving member.

I claim:

1. A power transmitting device of the character described comprising a member having a disk-shaped portion thereon, an annular groove in the face of said portion having an inwardly projecting lip, a centrally disposed plate on said portion having an outwardly extending flange corresponding to said lip; the said plate partly closing said groove and providing an annular slot in the face of the member defined by said lip and flange, a series of oppositely disposed notches in said lip and flange, a plurality of juxtapositioned relatively thin plates slidably mounted in said slot; the said plates having outwardly extending projections engageable with said lip and flange for locating said plates in an outwardly extending position on said member, a series of plates included with said plurality of plates and slidable within said notches for retaining all of said plates rotatable with said member, and means within said groove urging all of the plates toward normal position.

2. A power transmitting device comprising a member having a disk-shaped portion thereon, an annular groove in the face of said portion having an inwardly projecting lip in each opposite side thereof, a plurality of juxtapositioned relatively thin plates slidably mounted in said groove, outwardly extending projections on said plates engageable with said lips for locating said plates in an outwardly extending position on said member, and a hollow ring of resilient material in the bottom of said groove for urging all of the plates toward their normal position.

3. A power transmitting device as set forth in claim 2 wherein the said ring is constructed of rubber.

4. A power transmitting device of the character described comprising a member having a disk-shaped portion thereon, a recess in the face of said portion, a smaller disk-shaped member secured centrally in said recess and thereby providing an annular groove on the face of said member between the edge portion thereof and the periphery of said smaller disk, the said groove having inwardly projecting lips along the outer opposite edges thereof, a plurality of plates mounted in and projecting from said groove, stop means on said plates engaging said lips for retaining the plates in their normal position, and means comprising a ring of resilient material in the bottom of said groove for urging said plates outwardly in the groove toward their normal position, the said smaller disk shaped member being removable from said recess to permit insertion of said ring and plates into said groove.

JOHN R. BATTALINE.

REFERENCES CITED

The following references are of record in the file of this patent:

UNITED STATES PATENTS

| Number | Name | Date |
| --- | --- | --- |
| 1,717,019 | Ferrari | June 11, 1929 |
| 2,066,758 | Bassoff | Jan. 5, 1937 |
| 1,403,430 | Mackay | Jan. 10, 1922 |

FOREIGN PATENTS

| Number | Country | Date |
| --- | --- | --- |
| 820,087 | French | Nov. 2, 1937 |
| 403,745 | British | Jan. 4, 1934 |
| 114,340 | Swiss | Dec. 10, 1923 |